(12) United States Patent
Suzuki

(10) Patent No.: US 6,622,838 B2
(45) Date of Patent: Sep. 23, 2003

(54) ELECTROMAGNETIC PILOT-TYPE CLUTCH DEVICE

(75) Inventor: Kunihiko Suzuki, Kariya (JP)

(73) Assignee: Toyoda Koki Kabushiki Kaisha, Kariya (JP)

( * ) Notice: Subject to any disclaimer, the term of this patent is extended or adjusted under 35 U.S.C. 154(b) by 0 days.

(21) Appl. No.: 10/231,292

(22) Filed: Aug. 30, 2002

(65) Prior Publication Data

US 2003/0066727 A1 Apr. 10, 2003

(30) Foreign Application Priority Data

Aug. 31, 2001 (JP) ........................................ 2001-264068

(51) Int. Cl.[7] ............................................... F16D 43/00
(52) U.S. Cl. ............................................................. 192/35
(58) Field of Search ....................... 192/35, 48.2, 48.91, 192/48.92, 53.2, 54.1, 54.5, 54.52, 54.4, 57, 58.61, 65, 66.1, 69.42, 70.21, 70.23, 84.1, 84.7, 89.21, 93 R

(56) References Cited

U.S. PATENT DOCUMENTS 6,109,408 A 8/2000 Ikeda et al.
6,158,561 A * 12/2000 Sakai et al. .................... 192/35
6,413,183 B1 * 7/2002 Ishikawa et al. .............. 475/160

FOREIGN PATENT DOCUMENTS

| EP | 0 856 676 | 8/1998 |
| EP | 1 031 749 | 8/2000 |
| JP | 2000-234635 | 8/2000 |
| JP | 2002-139078 | 5/2002 |

* cited by examiner

*Primary Examiner*—Thu Nguyen
(74) *Attorney, Agent, or Firm*—Oblon, Spivak, McClelland, Maier & Neustadt, P.C.

(57) ABSTRACT

A rotating member, a main clutch, a pilot clutch, a yoke having an electromagnet fixed thereto, a cam-type amplifying mechanism, and a rear housing are mounted in a housing to form a housing assembly. An outer peripheral surface of the yoke of the housing assembly is fitted to a case in a fluid-tight manner so as to prevent rotation of the yoke. An inner peripheral surface of the yoke is fitted to an outer peripheral surface of a smaller-diameter rear housing portion in a fluid-tight manner. The housing assembly is thus mounted only in the case.

3 Claims, 3 Drawing Sheets

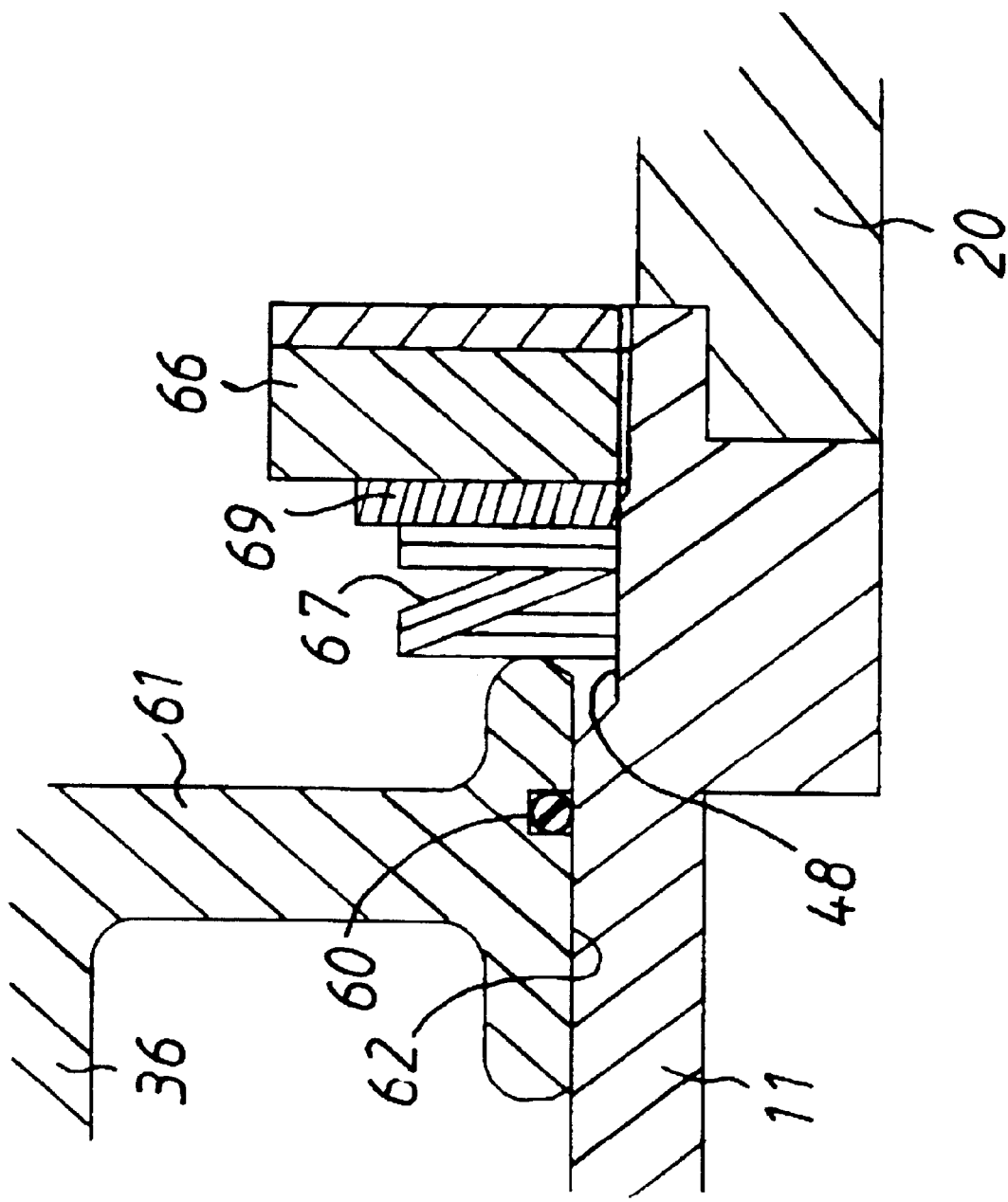

ELECTROMAGNETIC PILOT-TYPE CLUTCH DEVICE

BACKGROUND OF THE INVENTION

1. Field of the Invention

The present invention relates to an electromagnetic pilot-type clutch device.

2. Description of Related Art

As shown in FIG. 1, in a conventional electromagnetic pilot-type clutch device 10 for starting a vehicle by transmitting rotation power of an engine to a driving wheel, an output shaft 23 is rotatably supported on a rotation axis in a differential case 20 by tapered roller bearings 51, 52. The differential case 20 accommodates a differential gear 29 such as a bevel gear, and a case 11 is fixed to the differential case 20. The case 11 accommodates a housing 13 which is integrally connected to an input shaft 21. The housing 13 has a clutch accommodating chamber 14. An inner shaft 15 extends in the clutch accommodating chamber 14 and is rotatably supported by a bearing 24 and a needle bearing 25. Components such as a main clutch 16, a cam-type amplifying mechanism 18 and a pilot clutch 34 are mounted within the clutch accommodating chamber 14. An opening 64 of the housing 13 is covered by a rear housing 57. In order to maintain a fluid-tight state, oil seals 55, 68 are respectively provided between the outer peripheral surface of the inner shaft 15 and the inner peripheral surface of a smaller-diameter rear housing portion 37 and between the outer peripheral surface of a larger-diameter rear housing portion 38 and the inner peripheral surface of the case 11. An electromagnet 33 is fixed to a yoke 36 so as to face the pilot clutch 34 with the rear housing 57 interposed therebetween. The yoke 36 maintains a small gap between the yoke 36 itself and the smaller-diameter and larger-diameter rear housing portions 37, 38, and rotatably supports the smaller-diameter rear housing portion 37 by a bearing 28. The yoke 36 has a fitted portion 36a and an engaging portion 36b. The fitted portion 36a projects from the opening 64 of the housing 13 and is fittingly supported in a yoke fitting hole 50 of the differential case 20. A pin 47 is provided at an end of the case 11 so as to project from the end face of the case 11. The engaging portion 36b engages with the pin 47 in order to prevent rotation of the yoke 36. Various components are thus mounted within the housing 13 to form a housing assembly 41.

The housing 13 has a shoulder portion 46 in its front part. More specifically, the outer peripheral surface of the housing 13 forms the shoulder portion 46 near the input shaft 21. The shoulder portion 46 is rotatably supported within the case 11 by an outer bearing 65. An oil seal 19 is mounted near the bearing 65 in order to maintain a fluid-tight state of the case 11. The case 11 and the differential case 20 are separated at the end face of the opening 64 of the housing 13. An oil seal 54 is provided between the outer peripheral surface of a protruding end of the smaller-diameter rear housing portion 37 and the inner peripheral surface of the differential case 20 in order to separate the case 11 from the differential case 20 in a fluid-tight manner.

In the above conventional clutch device, the housing assembly is supported both in the case and the differential case. It takes a long time to mount the housing assembly to the case and the differential case. Moreover, if the shape of the housing assembly is changed, the shape of the differential case must also be changed accordingly. Furthermore, the respective central axes of the case and the differential case may be displaced from each other. Such displacement may degrade the fluid-tight property of the oil seal, and also may impede the balanced state of the input shaft and the output shaft within the case. Moreover, the engaging portion of the yoke for preventing rotation may become unstable. In such a case, the housing assembly may vibrate and abnormal noises are generated from the engaging portion due to variation in rotation of components such as the housing.

SUMMARY OF THE INVENTION

It is an object of the present invention to provide an electromagnetic pilot-type clutch device that improves mounting of a housing assembly, eliminates unbalanced rotation, and has no adverse effect on vibration of an axle caused by such unbalanced rotation.

In order to achieve the above object, an electromagnetic pilot-type clutch device according to the present invention includes an output shaft, an input shaft, a housing, a rotating member, a main clutch, a pilot clutch, a rear housing, a yoke, and a cam-type amplifying mechanism. The output shaft is rotatably supported on a rotation axis in a differential case accommodating a differential gear. The input shaft is rotatably supported on the rotation axis in a case fixed to the differential case. The housing is provided in the case, integrally connected to the input shaft, and has a clutch accommodating chamber. The rotating member is rotatably supported in the housing, extends in the clutch accommodating chamber, and is detachably connected to the output shaft in a rotatable manner. The main clutch has main outer clutch plates and main inner clutch plates. The main outer clutch plates are engaged with an inner peripheral surface of the clutch accommodating chamber with restriction of relative rotation so as to be movable in an axial direction. The main inner clutch plates are arranged alternately with the main outer clutch plates, and engaged with the rotating member with restriction of relative rotation so as to be movable in an axial direction. The pilot clutch has pilot outer clutch plates and pilot inner clutch plates. The pilot outer clutch plates are engaged with the inner peripheral surface of the clutch accommodating chamber with restriction of relative rotation so as to be movable in an axial direction. The pilot inner clutch plates are arranged alternately with the pilot outer clutch plates, and engaged with a first cam member with restriction of relative rotation so as to be movable in an axial direction. The rear housing is formed by a larger-diameter rear housing portion fixed to the housing, a smaller-diameter rear housing portion rotatably supporting the rotating member, and an annular, non-magnetic intermediate member connecting the larger-diameter and smaller-diameter rear housing portions together at a position facing an armature with the pilot clutch interposed therebetween. The yoke has an electromagnet fixed thereto, and rotatably supports the smaller-diameter rear housing portion by a bearing. The electromagnet is provided between the larger-diameter and smaller-diameter rear housing portions, and attracts the armature to press the pilot outer clutch plates and the pilot inner clutch plates together. The cam-type amplifying mechanism has the first cam member and a second cam member that contacts the main clutch. The cam-type amplifying mechanism allows the second cam member to be moved in an axial direction by a cam mechanism caused by relative rotation of the first and second cam members, thereby amplifying torque transmitted to the pilot clutch in response to attraction of the electromagnet and pressing the main clutch. An outer peripheral surface of the yoke is fitted to the case in a fluid-tight manner so as to prevent rotation of the yoke. An inner peripheral surface of the yoke is fitted to an outer peripheral surface of the smaller-diameter rear housing portion in a fluid-tight manner.

In the above electromagnetic pilot-type clutch device, a housing assembly is prepared as a sub assembly. More specifically, the rotating member, the main clutch, the pilot clutch, the yoke having the electromagnet fixed thereto, the cam-type amplifying mechanism, and the rear housing are mounted in the housing so as to form the housing assembly. The outer peripheral surface of the yoke of the housing assembly is fitted to the case so as to prevent rotation of the yoke. The inner peripheral surface of the yoke is fitted to the outer peripheral surface of the smaller-diameter rear housing portion in a fluid-tight manner by using a seal. The housing assembly is thus supported only in the case. This facilitates mounting of the housing assembly. Moreover, design of the differential case need not be changed even if design of the housing assembly is changed. This enables the use of a differential case having the same design. Furthermore, even if the respective central axes of the case and the differential case are displaced from each other, fluid-tight property of the oil seal will not be degraded, and the input shaft and the output shaft are retained in a well-balanced state. Moreover, the outer peripheral surface of the yoke is fitted to the case so as to be supported therein. As a result, the input shaft and the output shaft will not be rendered in an unbalanced state and vibration will not be caused by the displacement between the central axes of the case and the differential case.

Preferably, an elastic seal member is provided between the yoke and the case and between the yoke and the smaller-diameter rear housing portion.

In the above electromagnetic pilot-type clutch device, the elastic seal members provided between the yoke and the case and between the yoke and the smaller-diameter rear housing portion applies rotation resistance to the yoke. This rotation resistance effectively functions against variation in rotation of the housing assembly or the like. As a result, abnormal noises generated by the portion for preventing rotation of the yoke can be reliably reduced.

Preferably, the case and the differential case are fixed after being positioned by a fitting hole formed concentrically with the rotation axis.

In the above electromagnetic pilot-type clutch device, the case can be stably fitted to the differential case with high accuracy without causing any displacement between the central axes of the case and the differential case.

BRIEF DESCRIPTION OF THE DRAWINGS

FIG. 3 shows an embodiment in which an end face of a yoke is biased by a coned disc spring.

DESCRIPTION OF THE PREFERRED EMBODIMENTS

Figure 1:
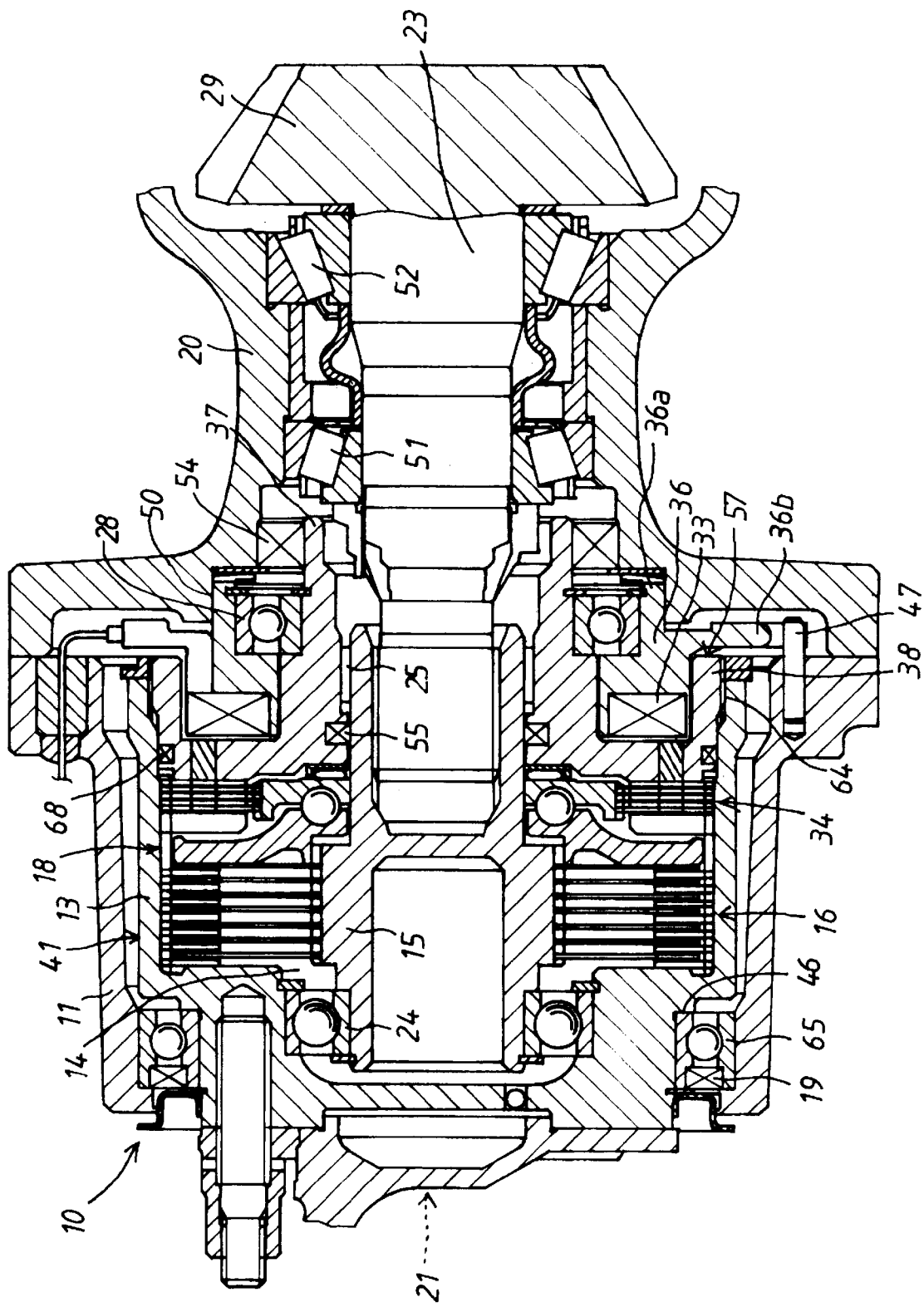
FIG. 1 is a longitudinal section of a conventional electromagnetic pilot-type clutch device.
Figure 2:
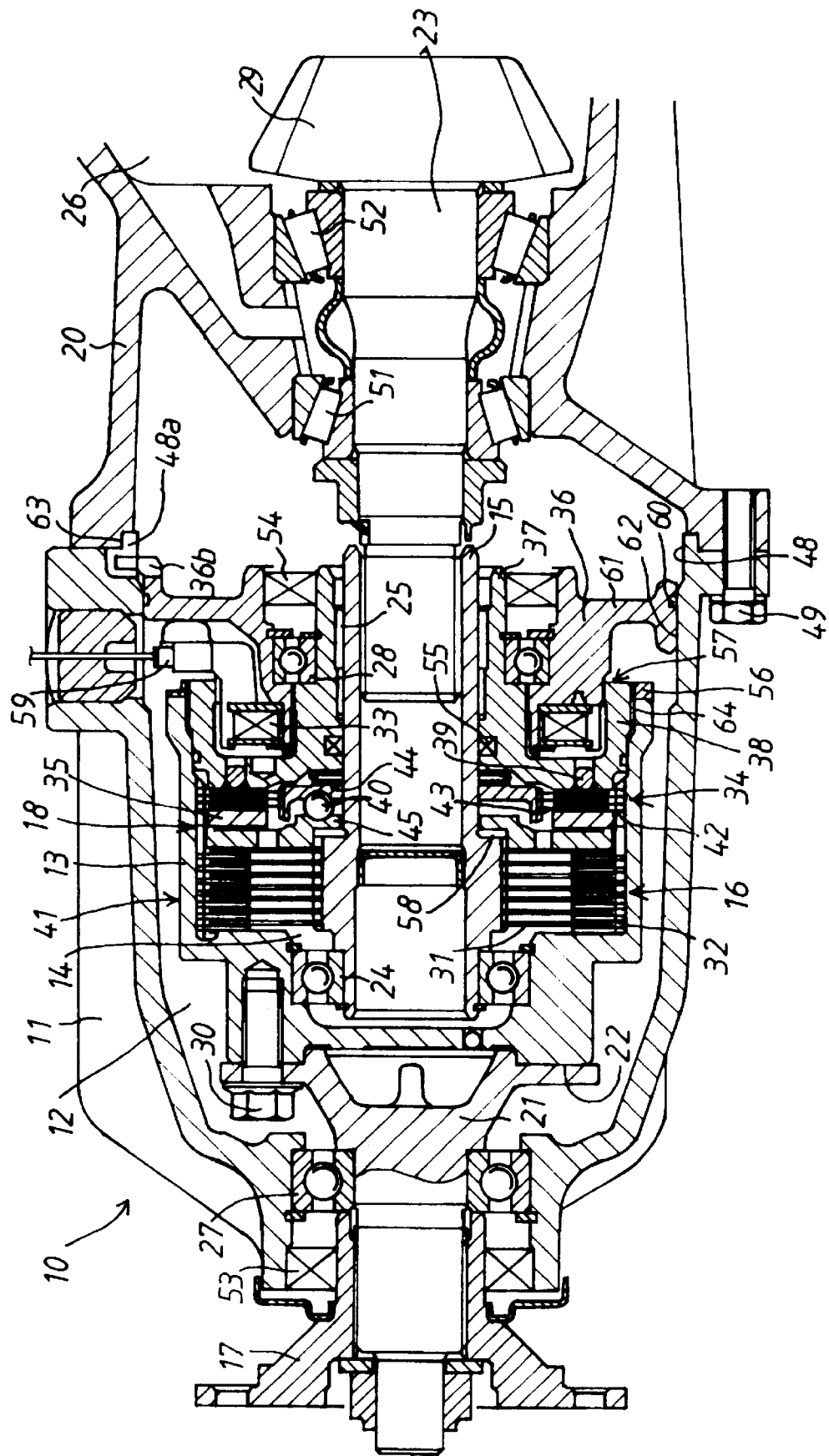
FIG. 2 is a longitudinal section of an electromagnetic pilot-type clutch device according to the present invention.

Hereinafter, embodiments of an electromagnetic pilot-type clutch device according to the present invention will be described in conjunction with the accompanying drawings. FIG. 2 is a longitudinal section of an electromagnetic pilot-type clutch device 10. A case 11 is fixed to a differential case 20 and mounted to the body of an automobile or the like. The differential case 20 has a gear accommodating chamber 26 storing gear oil. The gear accommodating chamber 26 accommodates a differential gear 29 including a bevel gear and the like. An output shaft 23 is rotatably supported on a rotation axis in the gear accommodating chamber 20. The case 11 has a storage chamber 12. The storage chamber 12 accommodates a housing 13. An input shaft 21 serving as a rotating shaft has a flange portion. The flange portion is fixed to a front end face 22 of the housing 13 by a plurality of bolts 30. The input shaft 21 is rotatably supported by a bearing 27 at the outer peripheral surface thereof. A tip portion of the input shaft 21 has external splines, and a cylindrical portion of a flanged connecting member 17 has internal splines at the inner peripheral surface thereof. The input shaft 21 is fitted in the flanged connecting member 17 by the external and internal splines. An annular oil seal 53 is mounted on the outer peripheral surface of the input shaft 21 in order to prevent foreign matters from being introduced from the outside and to prevent clutch oil stored in the storage chamber 12 from leaking to the outside.

Components such as a rotating member 15, a main clutch 16, a pilot clutch 34, a yoke 36 having an electromagnet 33 fixed thereto, a cam-type amplifying mechanism 18 and a rear housing 57 are mounted in the housing 13 to form a housing assembly 41. More specifically, the housing 13 has a clutch accommodating chamber 14. The rotating member 15, a stepped, cylindrical inner shaft, extends along a rotation axis within the clutch accommodating chamber 14. The inner shaft 15 is rotatably supported in the housing 13 by a bearing 24 and a needle bearing 25. A rear cylindrical portion of the inner shaft 15 has internal splines at the inner peripheral surface thereof, and a tip portion of the output shaft 23 has external splines. The output shaft 23 is fitted in the inner shaft 15 by these internal and external splines. The inner shaft 15 is thus connected to the output shaft 23 in a rotatable manner.

The main clutch 16 is mounted in the clutch accommodating chamber 14. The main clutch 16 is a wet-type multiple-disc friction clutch and includes a plurality of main inner clutch plates 31 and a plurality of main outer clutch plates 32. The main inner clutch plates 31 are fitted to the outer periphery of the inner shaft 15 by splines so as to be movable in an axial direction. The clutch accommodating chamber 14 has spline teeth at its inner peripheral surface, and the main outer clutch plates 32 are fitted to the inner peripheral surface of the clutch accommodating chamber 14 by splines so as to be movable in an axial direction. The main inner clutch plates 31 and the main outer clutch plates 32 are alternately arranged. In an engaged state, the main inner clutch plates 31 and the main outer clutch plates 32 contact each other and are frictionally engaged with each other. In a disengaged state, the main inner clutch plates 31 and the main outer clutch plates 32 are separated and disengaged from each other.

The cam-type amplifying mechanism 18 is mounted behind the main clutch 16, and is formed by a first cam member 44, a second cam member 45 and a plurality of cam followers 40. The second cam member 45 is fitted to the outer periphery of the inner shaft 15 by splines. One side of the second cam member 45 contacts the main clutch 16 so that the main clutch 16 is pressed by the cam mechanism. The first cam member 44 is fitted to the outer periphery of the inner shaft at a position behind the second cam member 45 with the plurality of cam followers 40 interposed therebetween. The first cam member 44 is located on the radial inner peripheral side of the pilot clutch 34 described below. The plurality of cam followers 40 are disposed in cam grooves formed between the first and second cam members 44, 45. A not-shown spring is disposed in the space formed by the second cam member 45 and a shoulder portion 58 of the inner shaft 15. The spring biases the second cam shaft 45 in a direction away from the main clutch 16. When the cam mechanism is not in operation, the spring causes the main inner clutch plates 31 and the main outer clutch plates 32 to be separated from each other, and presses the second cam member 44 so as to fit the plurality of cam followers 40 in the cam grooves formed between the first and second cam members 44, 45.

The pilot clutch 34 is formed by pilot outer clutch plates 42 and pilot inner clutch plates 43. The pilot clutch 34 is disposed behind the second cam member 45. The clutch accommodating chamber 14 has spline teeth at its inner peripheral surface, and the pilot outer clutch plates 42 are fitted to the inner peripheral surface of the clutch accommodating chamber 14 by splines so as to be movable in an axial direction. The pilot inner clutch plates 43 are fitted to the outer peripheral surface of the first cam member 44 by splines so as to be movable in the axial direction. An annular armature 35 is provided between the pilot clutch 34 and the second cam member 45, and is fitted to the inner peripheral surface of the clutch accommodating chamber 14 by splines so as to be movable in the axial direction. The armature 35 is attracted by magnetic flux formed about the electromagnet 33 described below. The armature 35 thus presses the pilot clutch 34 by the attraction of the electromagnet 33.

The rear housing 57 is fitted behind the pilot clutch 34 so as to cover an opening 64 of the housing 13. The rear housing 57 is formed by a smaller-diameter rear housing portion 37 and a larger-diameter rear housing portion 38 both having a stepped, cylindrical shape and an annular intermediate member 39. The smaller-diameter rear housing portion 37 rotatably supports the inner shaft 15 via the needle bearing 25. An annular oil seal 55 prevents clutch oil from leaking from a gap between the smaller-diameter rear housing portion 37 and the inner shaft 15 to the outside in order to maintain a fluid-tight state. The larger-diameter rear housing portion 38 is disposed on the outer periphery of the smaller-diameter rear housing portion 37 with a prescribed gap therebetween. The larger-diameter rear housing portion 38 is screwed on the inner peripheral surface of the housing 13 at a position near the opening 64. The annular intermediate member 39 formed from stainless steel is provided between the inner peripheral surface of the larger-diameter rear housing portion 38 and the outer peripheral surface of the smaller-diameter rear housing portion 37. The intermediate member 39 is welded to the smaller-diameter and larger-diameter rear housing portions 37, 38. After the housing 13 is mounted, the outer periphery of the larger-diameter rear housing portion 38 is fixed by a double nut 56. The smaller-diameter and larger-diameter rear housing portions 37, 38 are formed from a magnetic material, and the intermediate member 39 is formed from a non-magnetic material. This structure facilitates formation of magnetic flux by the electromagnet 33 described below.

The electromagnet 33 has an annular shape, and is surrounded by the intermediate member 39 and the smaller-diameter and larger-diameter rear housing portions 37, 38. The electromagnet 33 is fixed to the yoke 36, and a current is applied to the electromagnet 33 through a current-applying cord 59. The yoke 36 is disposed between the smaller-diameter and larger-diameter rear housing portions 37, 38 so as to have a small gap between the yoke 36 itself and the smaller-diameter and larger-diameter rear housing portions 37, 38. The yoke 36 rotatably supports the smaller-diameter rear housing portion 37 via a bearing 28, and has a projecting portion 61 that projects from the opening 64 of the housing 13. The projecting portion 61 of the yoke 36 has an L-shape in cross section. An outer peripheral surface 62 of the projecting portion 61 is fitted to the case 11 by using an oil seal 60. An annular oil seal 54 is mounted between the inner peripheral surface of the yoke 36 and the outer peripheral surface of the smaller-diameter rear housing portion 37. In general, only the clutch accommodating chamber 14 is filled with lubricating oil. In the present embodiment, however, the oil seal 54 seals the storage chamber 12 in a fluid-tight manner. Accordingly, the storage chamber 12 can also be filled with the same kind of oil. Increasing the filling amount of oil would extend the life of oil and improve durability of the device. The yoke 36 has an engaging portion 36b that projects radially from the projecting portion 61. The case 11 has a notch at an opening 48 thereof, and the engaging portion 36b engages with the notch 48a for restriction of rotation.

The opening 48 of the case 11 is fitted to a fitting hole 63 formed concentrically with a rotating shaft disposed in an opening of the differential case 20. In this state, the case 11 is fixed to the differential case 20 in a fluid-tight manner by a plurality of bolts 49. The differential case 20 rotatably supports the output shaft 23 via tapered roller bearings 51, 52. A tip portion of the output shaft 23 has external splines at its outer peripheral surface, and the inner shaft 15 has internal splines at its inner peripheral surface. The output shaft 23 is fitted in the inner shaft 15 by these external and internal splines. The output shaft 23 is thus connected to the inner shaft 15 in a rotatable manner.

Hereinafter, operation of the above electromagnetic pilot-type clutch device 10 will be described. As shown in FIG. 2, the electromagnetic pilot-type clutch device 10 is mounted in a path for transmitting driving power to a rear wheel of an automobile or the like, and functions as a clutch device for transmitting driving power. When an engine is started, the output of the engine is transmitted to the input shaft 21 through a transmission system, whereby the housing 13 is rotated. Upon starting of the engine, the electromagnetic 33 is normally in a non-conductive state and therefore generates no magnetic flux. Moreover, the pilot clutch 34 is in a disengaged state. The second cam member 45 is separated from the main clutch 16 by the biasing force of the spring, and the main inner clutch plates 31 are separated from the main outer clutch plates 32. In this state, the main inner clutch plates 31 and the main outer clutch plates 32 rotate relative to each other and no torque is transmitted from the input shaft 21 to the output shaft 23. The spring presses the second cam member 45 against the first cam member 44 with the cam followers 40 interposed therebetween. The pilot clutch 34 does not rotate because it is in a disengaged state.

When a current is applied to the electromagnet 33 through the current-applying cord 59, magnetic flux is generated about the electromagnet 33. The magnetic flux thus generated circulates from the electromagnet 33 in the following order and attracts the armature 35: the electromagnet 33, the yoke 36, the smaller-diameter rear housing portion 37, the pilot clutch 34, the armature 35, the larger-diameter rear housing portion 38, the outer-diameter portion 62 of the yoke 36, and the electromagnet 33, and attracts the armature 35. Due to the attraction of the magnetic flux, the armature 35 presses and frictionally engages with the pilot clutch 34. As a result, the first and second cam members 44, 45 of the cam-type amplifying mechanism 18 rotate relative to each other. The cam followers 40 and the cam grooves cause the second cam member 45 to move in such a direction that the second cam member 45 presses the main inner clutch plates 31 and the main outer clutch plates 32 of the main clutch 16 together. Torque corresponding to the frictional engagement of the pilot clutch 34 is thus transmitted to the main clutch 16. This toque is transmitted to the output shaft 23 through the inner shaft 15 and further transmitted to a drive shaft through the differential gear 29. As a result, a rear wheel of an automobile or the like is rotated.

As shown in FIG. 3, a nut 66 may be screwed at the opening 48 in the rear end of the case 11 and fixed thereto by a double nut, and a coned disc spring 67 as a spring member and a shim 69 may be provided between the nut 66 and an end face of the projecting portion 61 of the yoke 36 in order to bias the yoke 36 forward and apply preload to the bearings 28, 24.

What is claimed is:

1. An electromagnetic pilot-type clutch device, comprising:

an output shaft rotatably supported on a rotation axis in a differential case accommodating a differential gear;

an input shaft rotatably supported on the rotation axis in a case fixed to the differential case;

a housing provided in the case, integrally connected to the input shaft, and having a clutch accommodating chamber;

a rotating member rotatably supported in the housing, extending in the clutch accommodating chamber, and detachably connected to the output shaft in a rotatable manner;

a main clutch having main outer clutch plates and main inner clutch plates, the main outer clutch plates being engaged with an inner peripheral surface of the clutch accommodating chamber with restriction of relative rotation so as to be movable in an axial direction, and the main inner clutch plates being arranged alternately with the main outer clutch plates and engaged with the rotating member with restriction of relative rotation so as to be movable in an axial direction;

a pilot clutch having pilot outer clutch plates and pilot inner clutch plates, the pilot outer clutch plates being engaged with the inner peripheral surface of the clutch accommodating chamber with restriction of relative rotation so as to be movable in an axial direction, and the pilot inner clutch plates being arranged alternately with the pilot outer clutch plates and engaged with a first cam member with restriction of relative rotation so as to be movable in an axial direction;

a rear housing formed by a larger-diameter rear housing portion fixed to the housing, a smaller-diameter rear housing portion rotatably supporting the rotating member, and an annular, non-magnetic intermediate member connecting the larger-diameter and smaller-diameter rear housing portions together at a position facing an armature with the pilot clutch interposed therebetween;

a yoke having an electromagnet fixed thereto, and rotatably supporting the smaller-diameter rear housing portion by a bearing, the electromagnet being provided between the larger-diameter and smaller-diameter rear housing portions, for attracting the armature to press the pilot outer clutch plates and the pilot inner clutch plates together; and a cam-type amplifying mechanism having the first cam member and a second cam member that contacts the main clutch, for allowing the second cam member to be moved in an axial direction by an operation of a cam mechanism caused by relative rotation of the first and second cam members, thereby amplifying torque transmitted to the pilot clutch in response to attraction of the electromagnet and pressing the main clutch, wherein an outer peripheral surface of the yoke is fitted to the case in a fluid-tight manner so as to prevent rotation of the yoke, and an inner peripheral surface of the yoke is fitted to an outer peripheral surface of the smaller-diameter rear housing portion in a fluid-tight manner.

2. The electromagnetic pilot-type clutch device according to claim 1, wherein an elastic seal member is provided between the yoke and the case and between the yoke and the smaller-diameter rear housing portion.

3. The electromagnetic pilot-type clutch device according to claim 1 or 2, wherein the case and the differential case are fixed after being positioned by a fitting hole formed concentrically with the rotation axis.

* * * * *